United States Patent
Lee (10) Patent No.: US 8,831,649 B2
(45) Date of Patent: Sep. 9, 2014

(54) APPARATUS AND METHOD FOR EDITING EMOTICON IN A PORTABLE TERMINAL

(75) Inventor: Ji-Hoon Lee, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 363 days.

(21) Appl. No.: 13/040,117

(22) Filed: Mar. 3, 2011

(65) Prior Publication Data

US 2011/0217998 A1 Sep. 8, 2011

(30) Foreign Application Priority Data

Mar. 4, 2010 (KR) .................. 10-2010-0019347

(51) Int. Cl.
*H04W 4/12* (2009.01)
*H04M 1/00* (2006.01)

(52) U.S. Cl.
CPC . *H04M 1/00* (2013.01); *H04W 4/12* (2013.01)
USPC ........ 455/466; 455/566; 455/418; 455/575.1; 455/550.1; 345/168; 345/169; 345/171; 345/173; 345/160

(58) Field of Classification Search
USPC .................. 455/466, 566, 418, 575.1–575.5; 345/168–169, 171, 173, 520, 160
See application file for complete search history.

(56) References Cited

U.S. PATENT DOCUMENTS

| | | | | |
|---|---|---|---|---|
| 6,870,528 B2 * | 3/2005 | Ichikawa | ...................... | 345/171 |
| 7,403,888 B1 * | 7/2008 | Wang et al. | ....................... | 704/2 |
| 7,705,752 B2 * | 4/2010 | Bogomolov et al. | ........... | 341/22 |
| 2009/0174668 A1 * | 7/2009 | Cho | .............................. | 345/169 |

* cited by examiner

*Primary Examiner* — Michael T Vu (57) ABSTRACT

Emoticon message composition is supported in a portable terminal. An edit window in the form of a lattice is displayed for message composition. During special character input selection, a list window including a plurality of special characters is displayed in the edit window. The list window is arranged such that a plurality of lines are shown in the edit window. The special characters displayed in the list window are arranged in a sequence of being stored in a queue that includes one of a special character queue for a message recipient or a basic special character queue.

22 Claims, 7 Drawing Sheets

APPARATUS AND METHOD FOR EDITING EMOTICON IN A PORTABLE TERMINAL

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Mar. 4, 2010 and assigned Serial No. 10-2010-0019347, the entire disclosure of which is hereby incorporated by reference.

TECHNICAL FIELD OF THE INVENTION

The present invention relates to a portable terminal. More particularly, the present invention relates to an apparatus and method for editing an emoticon, which is the compound of emotion and icon, in a portable terminal.

BACKGROUND OF THE INVENTION

In modern society, the distribution rate of portable terminals has rapidly increased due to convenience and necessity. Accordingly, service providers and terminal manufacturers are providing many supplementary functions to increase the utilization of the portable terminals. The function of character message transmission/reception is one of the widely used functions along with the phone call functions of the portable terminals. Also, in transmitting/receiving a character message, not to mention simply transmitting/receiving a text message, transmitting/receiving an emoticon by using a combination of characters and special characters is frequently made.

However, since a current message composition window of a portable terminal is devised for composition of characters and character strings, there is difficulty in composing an emoticon in the message composition window. When a user is to compose an emoticon presenting a specific shape using characters, he/she cannot accurately determine the position relationship of each character and, because of emoticon peculiarity, he/she mostly presents a special character or a shape in a specific position rather than enumerating characters. Thus, for easy emoticon composition, a cursor should be able to move in up/down/left/right directions; however, it is difficult to move down in the message composition window. Also, the user often enters special characters during emoticon composition. However, regarding a general screen configuration of a special character input window, because the portable terminal shows, by way of one line, a special character edit window, it is difficult to determine which contents are above and below. Also, during special character input, the user primarily inputs frequently used special characters, but there is no function for displaying only the frequently used special characters. Furthermore, the frequently used special characters may be different for each user, but there is no function for accommodating user-level personalization for frequently used special characters.

SUMMARY OF THE INVENTION

To address the above-discussed deficiencies of the prior art, it is a primary aspect of the present invention to provide an apparatus and method for increasing the convenience of emoticon composition in a portable terminal.

Another aspect of the present invention is to provide an apparatus and method for supporting an operation mode for emoticon composition in a portable terminal.

A further aspect of the present invention is to provide an apparatus and method for supporting cursor manipulation making omnidirectional movement easy during emoticon composition in a portable terminal.

Yet another aspect of the present invention is to provide an apparatus and method for providing information on character position during emoticon composition in a portable terminal.

The above aspects are achieved by providing an apparatus and method for editing an emoticon in a portable terminal.

According to one aspect of the present invention, an operation method of a portable terminal is provided. The method includes displaying an edit window in the form of a lattice comprising cells for message composition. During special character input selection, a list window comprising a plurality of special characters is displayed in the edit window. The special characters displayed in the list window are arranged in a sequence of being stored in a queue that includes one of a special character queue for a message recipient or a basic special character queue.

According to another aspect of the present invention, a portable terminal apparatus is provided. The apparatus includes a display unit and a controller. The display unit displays an edit window in the form of a lattice comprising cells for message composition and, during special character input selection, displays a list window comprising a plurality of special characters in the edit window. The controller arranges the special characters displayed in the list window in a sequence of being stored in a queue that includes one of a special character queue for a message recipient or a basic special character queue.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal.

Embodiments of the present invention as described below provide a technology for increasing the convenience of emoticon composition in a portable terminal. In the following description, the portable terminal may comprise a cellular phone, a Personal Communication System (PCS), a Personal Digital Assistant (PDA), an International Mobile Telecommunication-2000 (IMT-2000) terminal, and such.

The feature of a portable terminal that supports an emoticon message composition scheme according to an embodiment of the present invention is described below.

Figure 1:
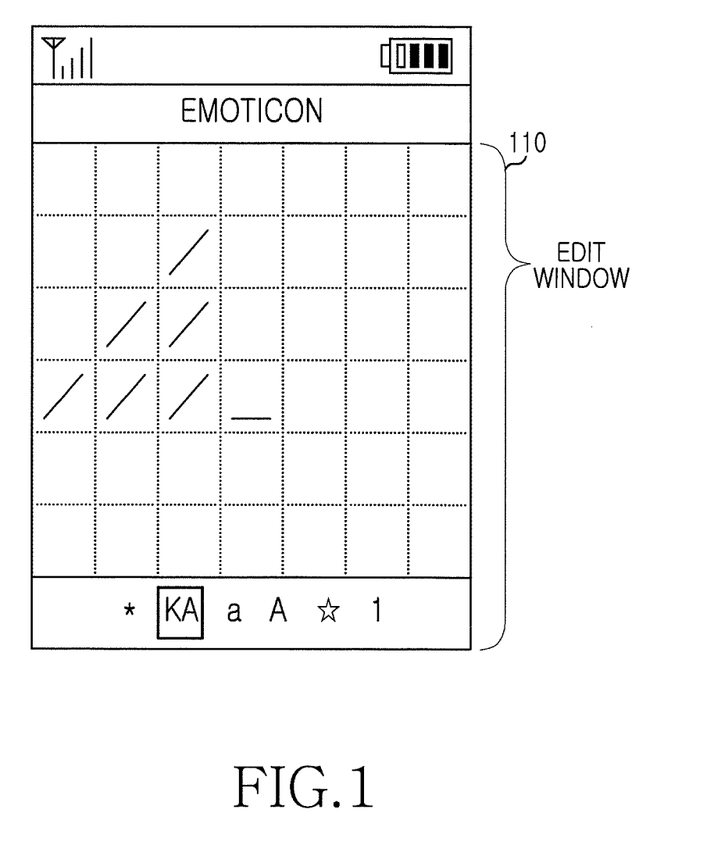
FIG. 1 illustrates an emoticon edition screen in a portable terminal according to an embodiment of the present invention.

In an embodiment, during emoticon message composition, an edit window comprised of a User Interface (UI) in the form of a lattice that is split into cells is displayed. At this time, the lattice-shaped UI may be displayed only when operating in a newly defined emoticon message composition mode, or can be displayed throughout message composition regardless of the emoticon message composition mode. For example, as illustrated in FIG. 1, an edit window 110 in the form of a lattice that includes seven cells in width and six cells in height may be displayed.

In some embodiments, a user may move a cursor in up/down/left/right directions by using the direction key. In other words, the user may move the cursor to one of an upper cell, a right cell, a left cell, and a lower cell relative to the current cell through the single direction key input. As such, the user may move the cursor to the immediate lower cell through by using the direction key.

Figure 2:
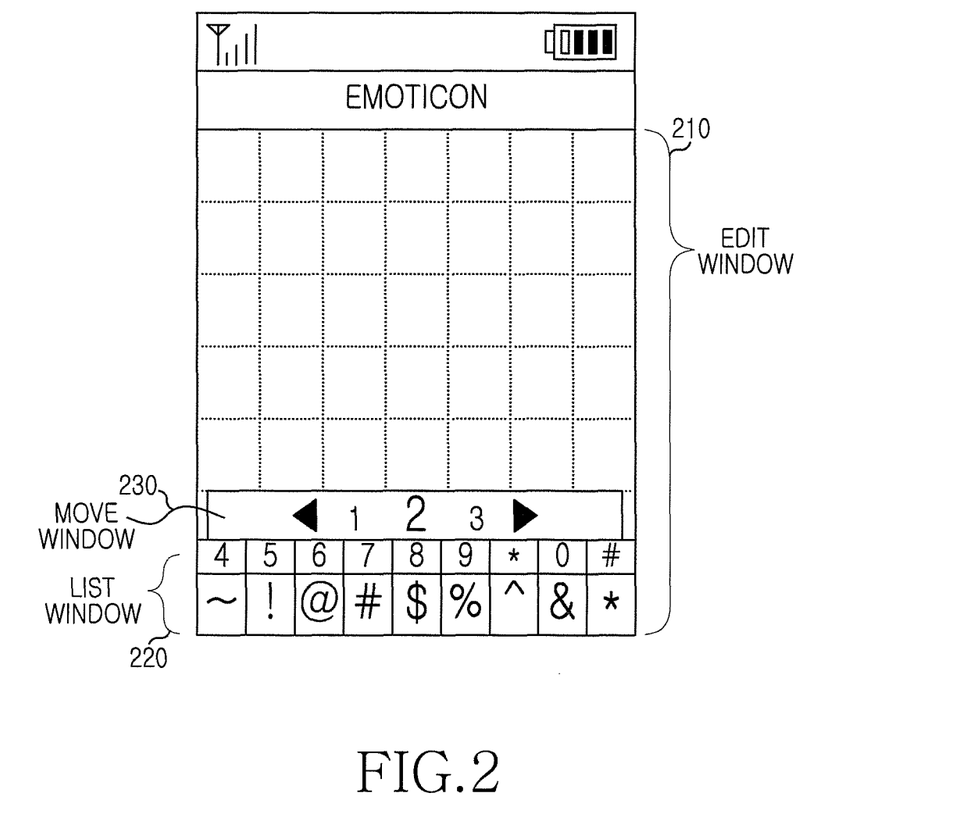
FIG. 2 illustrates an emoticon edition screen for inputting special characters in a portable terminal according to an embodiment of the present invention.

In some embodiments, during special character input, only frequently used special characters are displayed in a special character list window, and a plurality of lines are displayed on a composition screen. As such, a user may input special characters while viewing, on the composition screen, upper and lower lines of a line to which the special characters are input. For example, as illustrated in FIG. 2, a list window 220 for showing the special characters and a key corresponding to each special character may be displayed at a lower end of an edit window 210. In the embodiment illustrated, nine special input characters and their corresponding keys are displayed in the list window 220.

In some embodiments, when a user intends to input special characters other than frequently used nine special characters, left/right movement keys for selecting the special characters other than the frequently used nine special characters are provided. For example, as illustrated in FIG. 2, a move window 230 may be displayed above the edit window 210. The move window 230 indicates keys for displaying lists of other special characters not initially displayed in the list window 220.

In some embodiments, when the most frequently used special characters are stored in a special character table and the special character table is filled, the special character table is updated when a new special character is entered. That is, if a user inputs a new special character that does not currently exist in the special character table, a special character of the least use among the stored most frequently used special characters is deleted from the special character table, and the new special character is stored in place of the deleted special character.

In some embodiments, if a special character stored in a special character table is input, the entered special character moves to a first position of the special character table.

Figure 3:
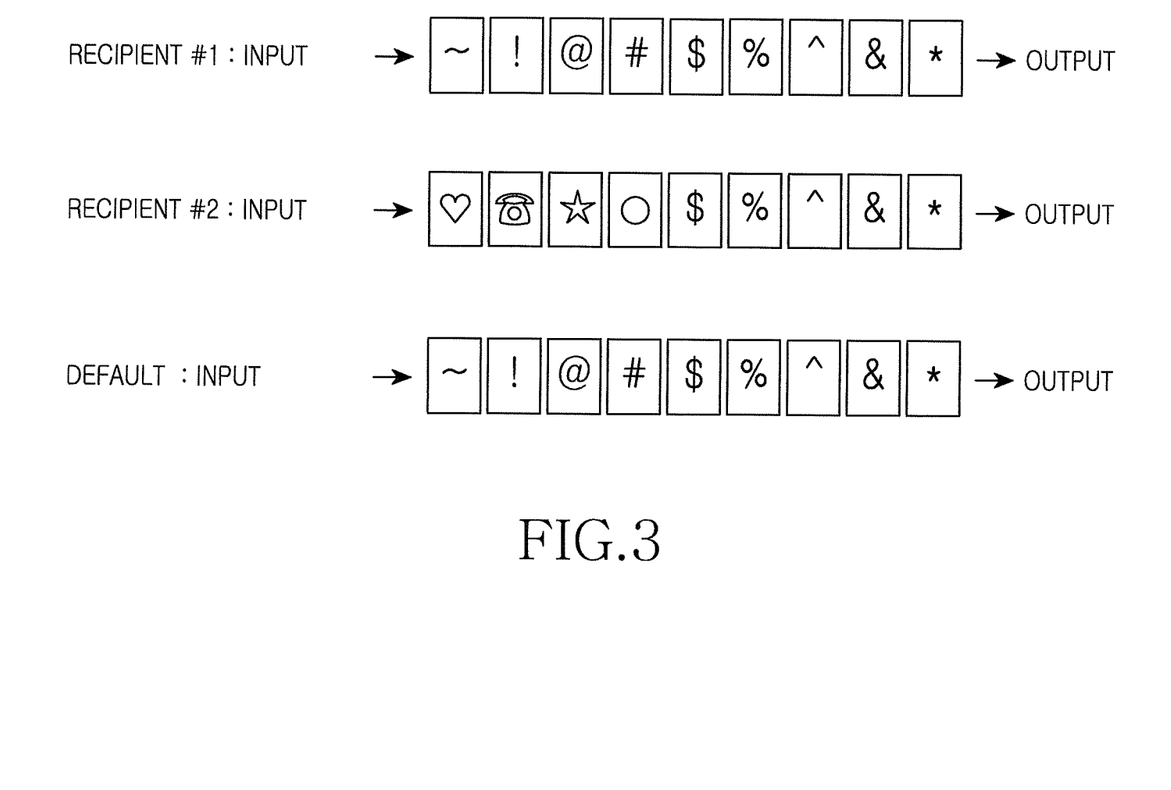
FIG. 3 illustrates special character queues in a portable terminal according to an embodiment of the present invention.

In some embodiments, a special character table follows a First Input First Output (FIFO) queue scheme. Here, the queue is generated and managed on a per-recipient basis. That is, as illustrated in FIG. 3, one queue is generated and managed per one recipient. In detail, a queue for recipient #1 stores special characters in order of '~', '!', '@', '#', '$', '%', '^', '&', '*', and a queue for recipient #2 stores special characters in order of '♡', '☏', '☆', '○', '$', '%', '^', '*'. Also, for a user whose queue is not yet generated, a default queue stores special characters in order of '~', '!', '@', '#', '$', '%', '^', '&', '*'. Accordingly, special characters displayed in a special character list window may be different according to recipient.

An operation process and construction of a portable terminal that supports an emoticon message composition scheme, as stated above, according to the present invention are described below in detail.

Figure 4:
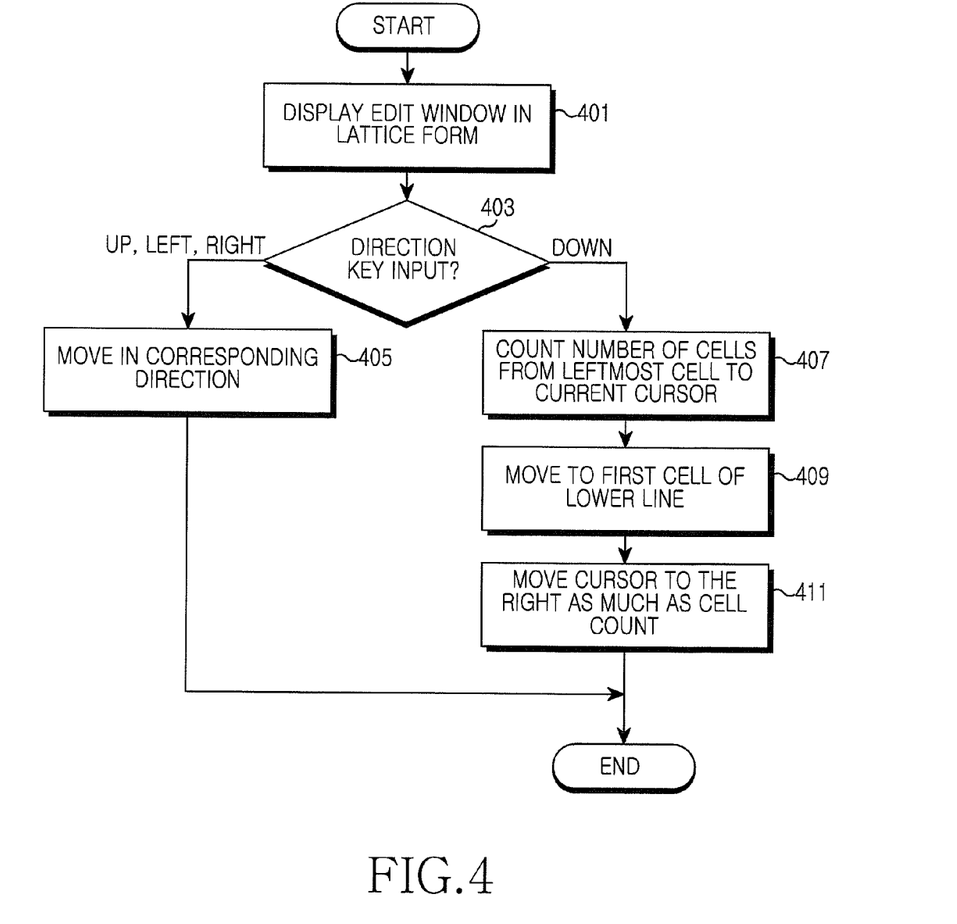
FIG. 4 illustrates a process of emoticon edition screen display and cursor movement in a portable terminal according to an embodiment of the present invention.

FIG. 4 illustrates a process of emoticon edition screen display and cursor movement in a portable terminal according to an embodiment of the present invention.

Referring to FIG. 4, in block 401, the portable terminal displays an edit window in the form of a lattice for message composition. Here, the lattice-shaped edit window may be displayed according to emoticon message composition mode entry by user's manipulation, or may be displayed according to a general message composition command.

In block 403, the portable terminal determines whether a direction key is input. In other words, the portable terminal determines whether an up key, a down key, a left key, or a right key for moving a cursor is input by the user in a state in which the lattice-shaped edit window is displayed.

If the up key, the left key, or the right key is input, the portable terminal proceeds to block 405 and moves the cursor in a corresponding direction. However, when the current cursor is positioned in one the cells in the leftmost column, the portable terminal does not move the cursor, although the left key is input. Also, when the current cursor is positioned in a cell of the uppermost line, the portable terminal does not move the cursor although the up key is input.

In contrast, if the down key is input, the portable terminal proceeds to block 407 and counts the number of cells from the leftmost cell of the current line to a position of the current cursor. In other words, the portable terminal determines how far the current cursor is apart the leftmost cell of the current line.

After counting the number of cells, the portable terminal proceeds to block 409 and moves the cursor to the first cell, i.e., the leftmost cell of a lower line. In other words, the portable terminal carriage-return processes the cursor.

After carriage-return processing, the portable terminal proceeds to block 411 and moves the cursor to the right by as much as the cell count determined in block 407. In other words, the portable terminal moves the cursor from the leftmost cell of the current line to the right by as much as the cell count determined in block 407. As a result, the cursor moves from the position of input of the down key to the immediate lower cell.

Figure 5A:
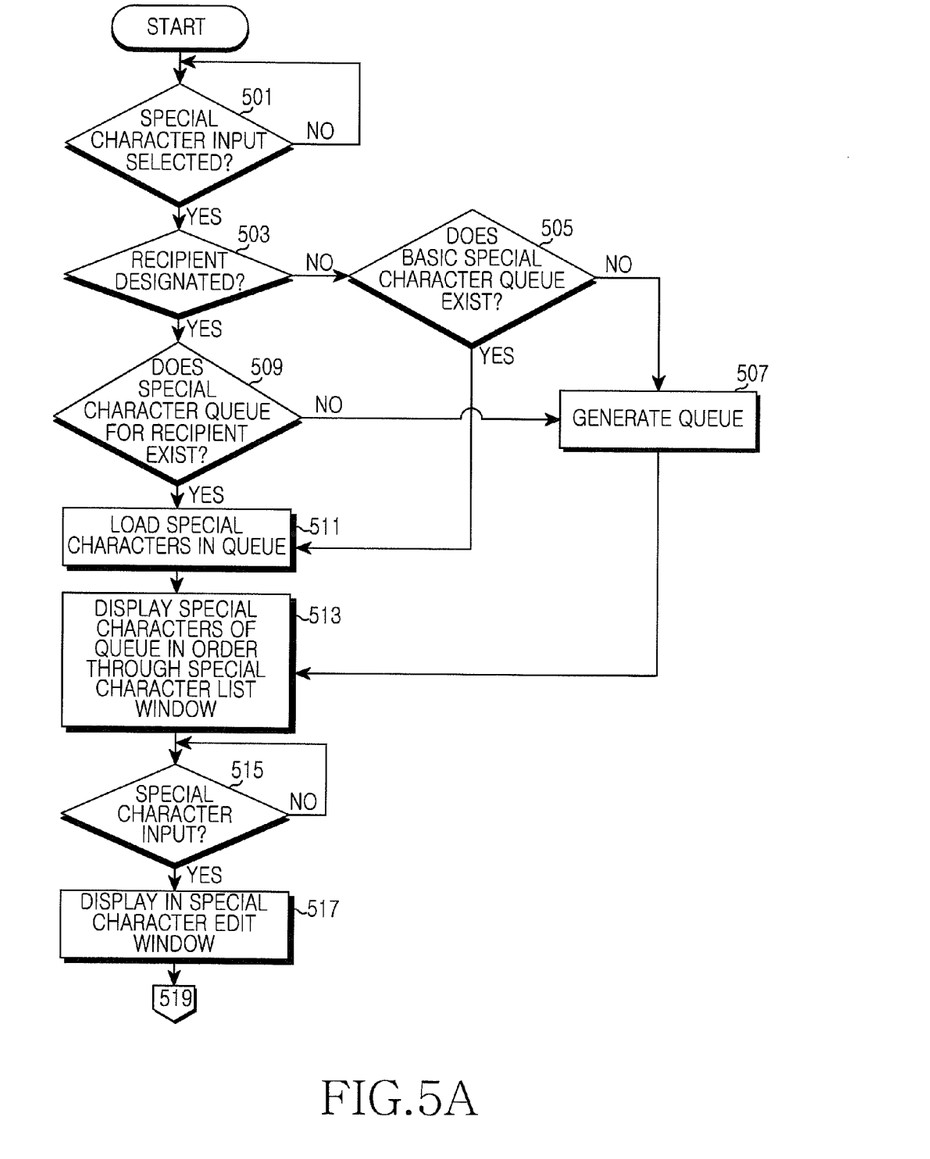
FIGS. 5A and 5B illustrate a special character input process in a portable terminal according to an embodiment of the present invention.
Figure 5B:
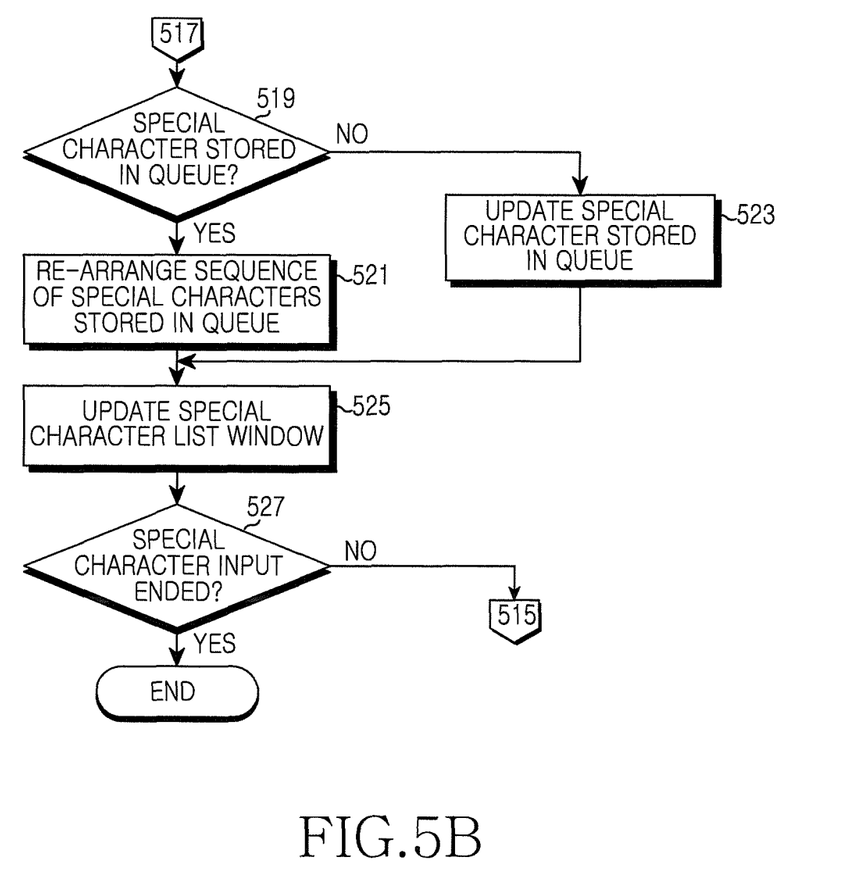

FIGS. 5A and 5B illustrate a special character input process in a portable terminal according to an embodiment of the present invention.

Referring to FIGS. 5A and 5B, in block 501, the portable terminal determines whether special character input is selected in the edit screen display for emoticon message composition. For example, the type of input for emoticon message composition may include Korean characters, numerals, capital alphabets, small alphabets, special characters, and such. In this situation, the portable terminal determines whether the special characters are selected as the input kind.

If the special character input is selected, the portable terminal proceeds to block 503 and determines whether a message recipient has been designated. If the recipient has not been designated, the portable terminal proceeds to block 505 and determines whether there is a basic special character queue. If the recipient has not been designated and the basic special character queue does not exist, the portable terminal proceeds to block 507 and generates the basic special character queue. For example, the basic special character queue may be generated according to a combination and sequence of predefined special characters, or generated identically with a stored queue for an arbitrary recipient.

In contrast, if the recipient has been designated, the portable terminal proceeds to block 509 and determines whether there is a special character queue for the recipient. If the recipient's special character queue does not exist, the portable terminal proceeds to block 507 and generates the recipient's special character queue. For example, the recipient's special character queue may be generated according to a combination and sequence of predefined special characters, or generated identically with a stored queue for an arbitrary recipient.

If the recipient has not been designated and the basic special character queue exists, the portable terminal proceeds to block 511 and loads special characters stored in the basic special character queue. Also, if the recipient has been designated and the recipient's special character queue does exist, the portable terminal proceeds to block 511 and loads special characters stored in the recipient's special character queue.

In block 513, the portable terminal displays, through a special character list window, the special characters stored in the basic special character queue or the recipient's special character queue. At this time, the portable terminal arranges the list window such that a plurality of lines within an emoticon message edit window is shown. Also, the portable terminal may display a move window for displaying additional special characters besides the special characters initially displayed in the list window. For example, the portable terminal displays a display window and a move window as illustrated in FIG. 2.

In block 515, the portable terminal determines whether a special character is input. In other words, the portable terminal determines whether one of the special characters displayed in the list window is selected. For example, the input of the special character may be recognized through the input or non-input of a numeral key corresponding to the special character.

If the special character is input, the portable terminal proceeds to block 517 and displays the input special character in the edit window. In other words, the portable terminal displays the selected special character in a cell where a cursor is positioned.

In block 519, the portable terminal determines whether the input special character is stored in the special character queue. In other words, the portable terminal determines whether the input special character exists among the special characters initially displayed in the list window.

If the input special character is stored in the special character queue, the portable terminal proceeds to block 521 and rearranges the sequence of the special characters stored in the queue. That is, because the latest input time point of the input special character is changed due to the special character input of block 515, the portable terminal moves the input special character to the last position of the queue. That is, the portable terminal deletes the input special character from the queue, and re-inserts the input special character in the last position of the queue.

In contrast, if the input special character is not the special character stored in the queue, the portable terminal proceeds to block 523 and updates the special character stored in the queue. That is, the portable terminal adds the input special character to the queue. At this time, when the queue is full, the portable terminal inserts the input special character, after deleting the first input special character from the queue.

In block 525, the portable terminal updates the special character list window. That is, the portable terminal reflects a queue state changed through block 521 or block 523.

In block 527, the portable terminal determines whether special character input has ended. For example, the type of input for emoticon message edition may include Korean characters, numerals, capital alphabets, small alphabets, special characters and the like. In this situation, the portable terminal determines if an item other than the special characters is selected as the input character. If the special character input has ended, the portable terminal terminates the process according to an embodiment of the present invention. In contrast, if the special character input has not ended, the portable terminal returns to block 515.

Figure 6:
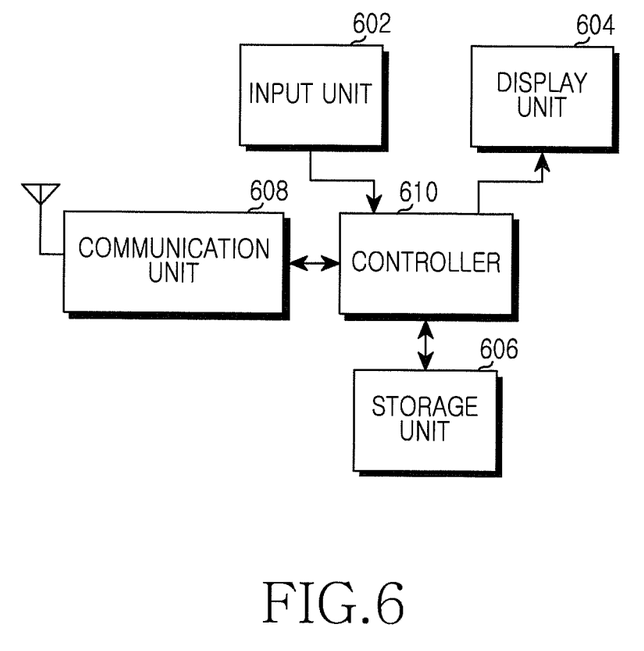
FIG. 6 illustrates a block diagram of a portable terminal according to an embodiment of the present invention.

FIG. 6 illustrates a block diagram of a portable terminal according to an embodiment of the present invention.

As illustrated in FIG. 6, the portable terminal includes an input unit 602, a display unit 604, a storage unit 606, a communication unit 608, and a controller 610.

The input unit 602 recognizes an input generated by a user and provides information corresponding to the input to the controller 610. That is, the input unit 602 processes a user's input through a keyboard, a keypad, a touch screen, a touch pad, a mouse, a special function button, and such.

The display unit 604 displays state information generated during operation of the portable terminal and numerals, characters, videos and such, resulting from the execution of an application program. That is, the display unit 604 visually displays image data provided from the controller 610. For example, the display unit 104 may be a Liquid Crystal Display (LCD), an Organic Light-Emitting Diode (OLED), and such.

The storage unit 606 stores data of a basic program for operation of the portable terminal, an application program, user contents, and such. And the storage unit 606 provides the stored data according to a request from the controller 610.

The communication unit 608 provides an interface for signal transmission/reception over a wireless channel. That is, the communication unit 608 converts transmit data into a Radio Frequency (RF) signal, transmits the RF signal through an antenna, and converts an RF signal received through the antenna into receive data. At this time, the communication unit 608 performs conversion between data and an RF signal according to a communication system standard.

The controller 610 controls the general functions of the portable terminal. For example, the controller 610 provides image data to the display unit 604 and processes input information provided from the input unit 602. According to an embodiment of the present invention, the controller 610 controls functions for supporting an emoticon message composition scheme. The functions of the controller 610 for supporting the emoticon message composition scheme according to an embodiment of the present invention are described below.

At emoticon message composition mode entry or general message composition, the controller 610 displays an edit window in the form of a lattice for emoticon message composition on the display unit 604.

If the input of an up key, a left key, or a right key through the input unit 602 is recognized in a state where the lattice-shaped edit window is displayed, the controller 610 moves a cursor in a corresponding direction. Also, if the input of a down key through the input unit 602 is recognized in the state where the lattice-shaped edit window is displayed, the controller 610 determines a cell count ranging from the leftmost cell to a position of the current cursor, carriage-return processes the cursor, and moves the cursor to the right by as much as the determined cell count. As a result, the cursor is moved from a current position to the immediate lower cell.

If special character input is selected in the state in which the lattice-shaped edit window is displayed, the controller 610 determines the designation or non-designation of a recipient of an emoticon message, the existence or non-existence of a basic special character queue when the recipient has not been designated, and the existence or non-existence of a special character queue for the recipient when the recipient has been designated. When the recipient has not been designated and the basic special character queue does not exist, the controller 610 generates the basic special character queue. Also, when the recipient has been designated but the recipient's special character queue does not exist, the controller 610 generates the recipient's special character queue. For example, the basic special character queue and the recipient's special character queue may be generated according to a combination and sequence of predefined special characters, or generated identically with a stored queue for an arbitrary recipient. When the recipient has not been designated and the basic special character queue exists, or when the recipient has been designated and the recipient's special character queue exists, the controller 610 loads the special characters stored in the basic special character queue.

After creating the queue or loading the special characters stored in the queue, the controller 610 displays a special character list window. In an embodiment, the controller 610 displays special characters stored in the basic special character queue or the recipient's special character queue in order according to the most recently used special character, through the special character list window, and arranges the list window such that a plurality of lines within an emoticon message edit window are shown.

If a special character is input in a state of displaying the list window, the controller 610 displays the input special character in the edit window, and changes a special character storage state depending on whether the input special character has been stored in a queue. If the input special character is a special character stored in the queue, the controller 610 rearranges the sequence of the special characters stored in the queue. In other words, the controller 610 deletes the input special character from the queue, and re-inserts the input special character. If the input special character is not currently stored in the queue, the controller 610 adds the input special character to the queue. In an embodiment, when the queue is saturated (i.e. full), the controller 610 inserts the input special character, after deleting the first input special character from the queue. And, with a change of a special character storage state of the queue, the controller 610 updates the special character list window.

As described above, embodiments of the present invention display lattice-shaped cells at emoticon composition, thereby allowing a user to easily compose his/her own desiring shape, and move down a cursor by the single direction key input. Also, the embodiments of the present invention display frequently used special characters on a per-recipient basis at special character input, thereby allowing the user to make convenient and fast use of the special characters.

While the invention has been shown and described with reference to certain preferred embodiments thereof, it will be understood by those skilled in the art that various changes in form and details may be made without departing from the spirit and scope of the invention as defined by the appended claims.

What is claimed is:

1. A method of operating a portable terminal, the method comprising:
    displaying rows and columns of cells in an edit window, wherein the cells are for entry of characters into the cells during message composition and each of the cells is a space for an input character;
    in response to receiving a selection to input special characters, displaying a list window comprising a plurality of special characters, and arranging the list window such that a plurality of lines are shown in the edit window; and
    arranging the special characters displayed in the list window in a sequence of being stored in a queue comprising one of a special character queue for a message recipient and a basic special character queue, wherein the queue defines an order of the special characters displayed in the list window.

2. The method of claim 1, further comprising:
    moving a cursor from a current cell to one of an upper cell, a right cell, a left cell, and a lower cell relative to the current cell based on a single direction key input.

3. The method of claim 2, wherein moving the cursor to the lower cell comprises:
    identifying a number of cells from a leftmost cell of a current row to a position of the cursor;
    moving the cursor to a leftmost cell of a lower line by way of a carriage return processing; and
    moving the cursor from the leftmost cell of the lower line to the right by the number of cells.

4. The method of claim 1, further comprising:
    in response to receiving the selection to input special characters, displaying a move window to display additional special characters other than the plurality of special characters initially displayed in the list window.

5. The method of claim 4, further comprising:
if a special character is input, determining whether the input special character is comprised in the queue storing the plurality of special characters initially displayed in the list window;
if the input special character is comprised in the queue, deleting the input special character from the queue; and
re-inserting the input special character into the queue.

6. The method of claim 4, further comprising:
if a special character is input, determining whether the input special character is comprised in the queue storing the plurality of special characters initially displayed in the list window; and
if the input special character is not comprised in the queue, adding the input special character to the queue.

7. The method of claim 6, further comprising:
when the queue is full, deleting an earliest stored special character from the queue, prior to adding the input special character to the queue.

8. The method of claim 1, wherein displaying the list window comprising the plurality of special characters comprises:
in response to receiving the selection to input special characters, if the message recipient has not been designated, loading the special characters stored in the basic special character queue.

9. The method of claim 8, further comprising:
if the basic special character queue does not exist, creating the basic special character queue.

10. The method of claim 1, wherein displaying the list window comprising the plurality of special characters comprises:
in response to receiving the selection to input special characters, if the message recipient has been designated, loading special characters stored in the special character queue for the message recipient.

11. The method of claim 10, further comprising:
if the recipient's special character queue does not exist, creating the special character queue for the message recipient.

12. A portable terminal apparatus comprising:
a display unit configured to display rows and columns of cells for character entry in an edit window, the cells for entry of characters into the cells during message composition and, in response to a selection to input special characters, display a list window comprising a plurality of special characters, wherein the cells are for entry of characters into the cells during message conmposition and each of the cells is a space for an input character; and
a controller configured to arrange the list window such that a plurality of lines are shown in the edit window, and arrange the special characters displayed in the list window in a sequence of being stored in a queue comprising one of a special character queue for a message recipient and a basic special character queue, wherein the queue defines an order of the special characters displayed in the list window.

13. The apparatus of claim 12, wherein the controller is further configured to move a cursor from a current cell to one of an upper cell, a right cell, a left cell, and a lower cell relative to the current cell based on a single direction key input.

14. The apparatus of claim 13, wherein, if a down key is input, the controller is further configured to determine a cell count from a leftmost cell of a current row to a position of the cursor, move the cursor to a leftmost cell of a lower line by way of a carriage return processing, and move the cursor from the leftmost cell of the lower line to the right by the determined cell count.

15. The apparatus of claim 12, wherein, in response to the selection to input special characters, the display unit is further configured to display a move window configured to display additional special characters other than the plurality of special characters initially displayed in the list window.

16. The apparatus of claim 15, wherein, if a special character is input, the controller is further configured to determine whether the input special character is comprised in the queue storing the plurality of special characters initially displayed in the list window, delete the input special character from the queue if the input special character is comprised in the queue, and re-insert the input special character into the queue.

17. The apparatus of claim 15, wherein, if a special character is input, the controller is further configured to determine whether the input special character is comprised in the queue storing the plurality of special characters initially displayed in the list window and, if the input special character is not comprised in the queue, add the input special character to the queue.

18. The apparatus of claim 17, wherein, when the queue is full, the controller is further configured to delete an earliest stored special character from the queue, prior to adding the input special character to the queue.

19. The apparatus of claim 12, wherein, in response to the selection to input special characters, if the message recipient has not been designated, the controller is further configured to load the special characters stored in the basic special character queue.

20. The apparatus of claim 19, wherein, if the basic special character queue does not exist, the controller is further configured to generate the basic special character queue.

21. The apparatus of claim 12, wherein, in response to the selection to input special characters, if the message recipient has been designated, the controller is further configured to load special characters stored in the special character queue for the message recipient.

22. The apparatus of claim 21, wherein, if the recipient's special character queue does not exist, the controller is further configured to generate the special character queue for the message recipient.

* * * * *